(12) United States Patent
McConn et al.

(10) Patent No.: US 8,117,271 B2
(45) Date of Patent: Feb. 14, 2012

(54) DIGITAL IMAGE SHARING ENABLED CHAT APPLICATION

(75) Inventors: Christopher E. McConn, Santa Cruz, CA (US); Kevin D. Landers, Sunnyvale, CA (US)

(73) Assignee: Canon U.S.A., Inc., Lake Success, NY (US)

( * ) Notice: Subject to any disclaimer, the term of this patent is extended or adjusted under 35 U.S.C. 154(b) by 0 days.

(21) Appl. No.: 13/028,045

(22) Filed: Feb. 15, 2011

(65) Prior Publication Data

US 2011/0138004 A1      Jun. 9, 2011

Related U.S. Application Data

(63) Continuation of application No. 10/382,229, filed on Mar. 5, 2003, now Pat. No. 7,930,350.

(51) Int. Cl.
*G06F 15/16* (2006.01)
*G06F 12/00* (2006.01)

(52) U.S. Cl. ........................................ 709/206; 709/227

(58) Field of Classification Search .......... 709/206–207, 709/217–218, 223–229, 250
See application file for complete search history.

(56) References Cited

U.S. PATENT DOCUMENTS

| 7,080,124 | B1* | 7/2006 | Shankar | 709/206 |
|---|---|---|---|---|
| 7,124,164 | B1* | 10/2006 | Chemtob | 709/204 |
| 2003/0097404 | A1* | 5/2003 | Sakakibara et al. | 709/203 |
| 2003/0234953 | A1* | 12/2003 | Dawson et al. | 358/1.15 |
| 2005/0086605 | A1* | 4/2005 | Ferrer et al. | 715/745 |
| 2007/0203984 | A2* | 8/2007 | AlHusseini et al. | 709/205 |

* cited by examiner

*Primary Examiner* — Zarni Maung

(74) *Attorney, Agent, or Firm* — Canon U.S.A., Inc., IP Division

(57) ABSTRACT

A method, system, and computer program for remotely sharing digital photographic images. The method, system, and computer program comprising launching at least a first and second real-time chat clients, selecting at least a first digital photographic image, establishing a chat session between the at least first and second real-time chat clients, transmitting at least a first digital photographic image from the at least first real-time chat client to the at least second real-time chat client, and facilitating a chat session between the at least first real-time chat client and the at least second real-time chat client through which the at least first and second real-time chat clients converse with each other, wherein the subject of the conversation is the at least first digital photographic image.

28 Claims, 12 Drawing Sheets

DIGITAL IMAGE SHARING ENABLED CHAT APPLICATION

CROSS REFERENCE TO RELATED APPLICATIONS

This application is a continuation of U.S. patent application Ser. No. 10/382,229, filed Mar. 5, 2003, which is incorporated by reference in its entirety.

BACKGROUND OF THE INVENTION

1. Field of the Invention

The present invention relates to a computer system, and deals more specifically with a method, system, and computer program product for enabling messaging systems to provide real-time digital photo sharing capabilities.

2. Description of the Related Art

A widely used Internet application is instant messaging. Instant messaging allows end users to select "buddies" or authorized partners and assign these buddies to "buddy groups", automatically register a person when on-line, advertise the user's selected buddies to the user when the selected buddies register on-line, advertise the user's presence on-line to others who have selected the user as a buddy, and participate in instant messaging communication or "chatting" between two on-line users. Popular instant messaging applications include AOL's Instant Messenger$^{SM}$ and Microsoft's Network Messenger™ services. Because instant messaging is a text-based service, instant messaging communication is generally not burdened by the need to transfer large graphic, sound, or program files. As a result, instant messaging is a relatively quick and easy to use system.

Another widely based Internet application is web-based photo sharing. Shutterfly® is an example of such an application. Web-based photo sharing occurs when a user registers with a photo-sharing web site, uploads digital photographic images to the site, organizes them into albums, and then notifies others of the location of the photos to be shared. Notification usually occurs via electronic mail messaging. The user is usually notified via electronic mail by the person viewing the photos that the photos have been viewed.

Current web-based photo sharing is not an interactive experience between the party sharing the photos and the party(s) viewing the photos. The current experience is much like two persons holding a conversation via their answering machines. Photo sharing is much more of an appealing experience when the parties sharing the photos are able to converse real-time about the photos. Current web-based photo sharing however lacks a real-time conversation feature.

Chatting applications provide real-time conversation capability, but they lack any photo sharing features. Current real-time chat applications support sending of files between two parties, but this file transfer support lacks any photo sharing capabilities. Even if it did, only one photo at-a-time could be shared, which would be a tedious process for both parties.

What is needed is an application that provides both real-time chatting and complete photo-sharing support. Such an application would allow for instantly transmitting messages and images between parties while providing complete photo-sharing capabilities.

SUMMARY OF THE INVENTION

It is an object of the foregoing invention to address the foregoing difficulty by providing an application that provides for both real-time chatting and complete photo sharing support.

In one aspect, at least first and second real-time chat clients are launched and a chat session established between the at least first and second real-time chat clients. The at least first real-time client transmits an album to the at least second real-time chat client, wherein the album contains digital photographic images. A digital photographic image is selected from the album and a chat session between the at least first real-time chat client and the at least second real-time client is facilitated, wherein the at least first real-time chat client and the at least second real-time chat client converse with each other and subject of the conversation is the digital photographic image.

In yet another aspect, upon selection of the digital photographic image from the album, a chat window is launched on the at least first and second real-time clients. The digital photographic image is displayed in a first section of the chat window, text describing the digital photographic image is displayed in a second section of the chat window, a chat log is displayed in a third section of the chat window, and a message composition area is displayed in a fourth section of the chat window. The chat log is saved as part of the digital photographic image's metadata. Saving the chat log as part of the metadata allows for a more detailed description of the digital photographic image than simply a title or general description.

This brief summary has been provided so that the nature of the invention may be understood quickly. A more complete understanding of the invention can be obtained by reference to the following detailed description of the preferred embodiment(s) thereof in connection with the attached drawings.

DETAILED DESCRIPTION OF THE PREFERRED EMBODIMENTS

Figure 1:
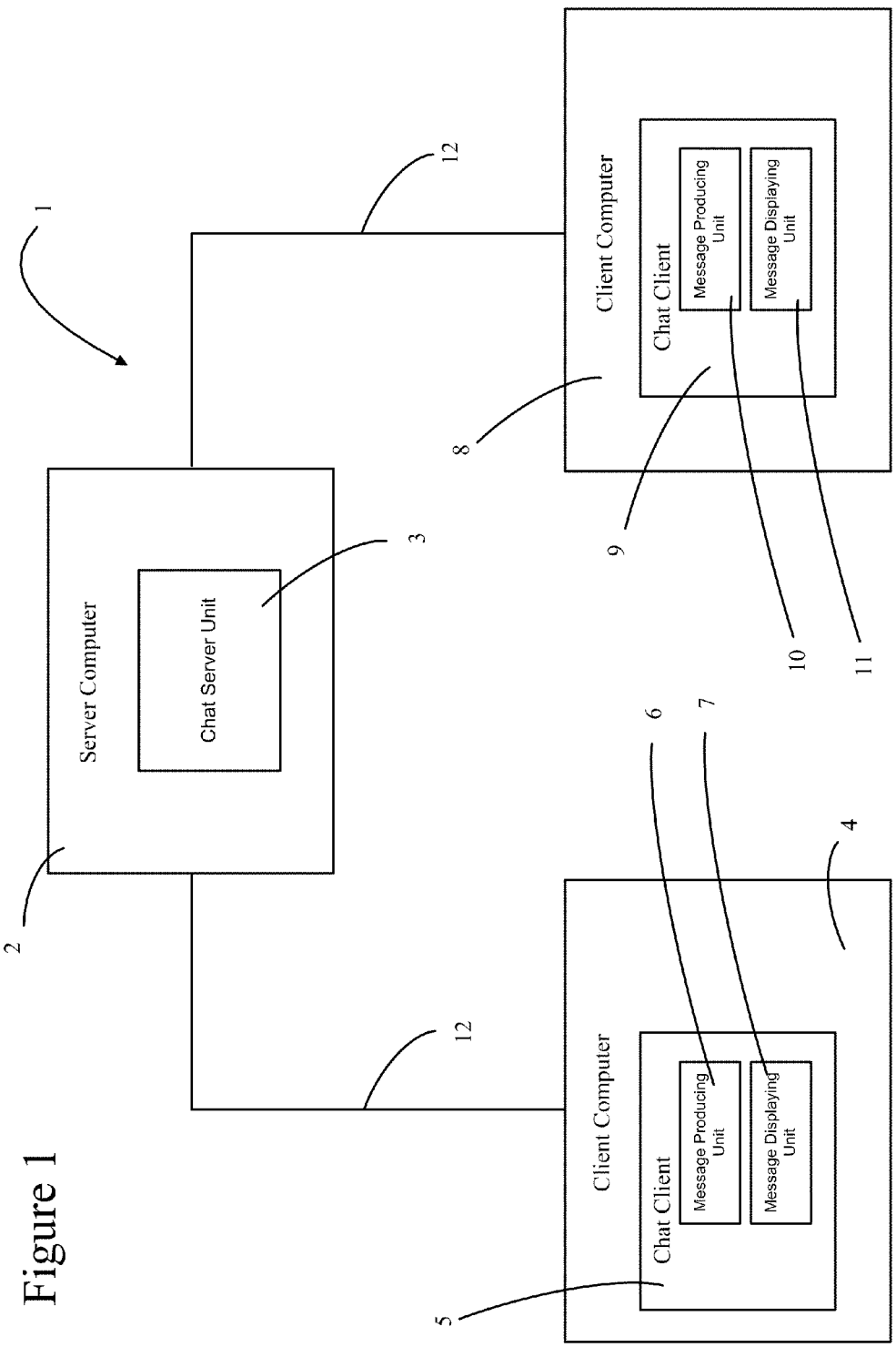
FIG. 1 is a representational view depicting a general configuration of an instant messaging or real-time chat system in which the digital image sharing enabled application of the present invention may be utilized.

FIG. 1 is a representational view depicting a general configuration of an instant messaging system in which the present invention may be utilized.

Instant messaging system 1 includes server computer 2 and client computers 4, 8. Client computers 4, 8 are connected to server computer 2 via World Wide Web connection 12. Server computer 2 contains instant messaging server unit 3. Client computer 4 contains instant messaging chat client 5, which in turn includes message producing unit 6 and message displaying unit 7. Client computer 8 contains instant messaging chat client 9, which in turn includes message producing unit 10 and message displaying unit 11.

A typical instant messaging session occurs as follows. Instant messaging chat client 5 creates a message at the message-producing unit 6 and sends the message to instant messaging server unit 3. Instant messaging server unit 3 in turn sends the message to instant messaging chat client 9, which displays the message with message displaying unit 11. Instant messaging chat client 9 then creates a message at message producing unit 10 and sends the message to instant messaging server unit 3. Instant messaging server unit 3 sends the message to instant messaging chat client 5, which displays the message with message displaying unit 7. This process is repeated for the duration of the instant messaging session.

Figure 2:
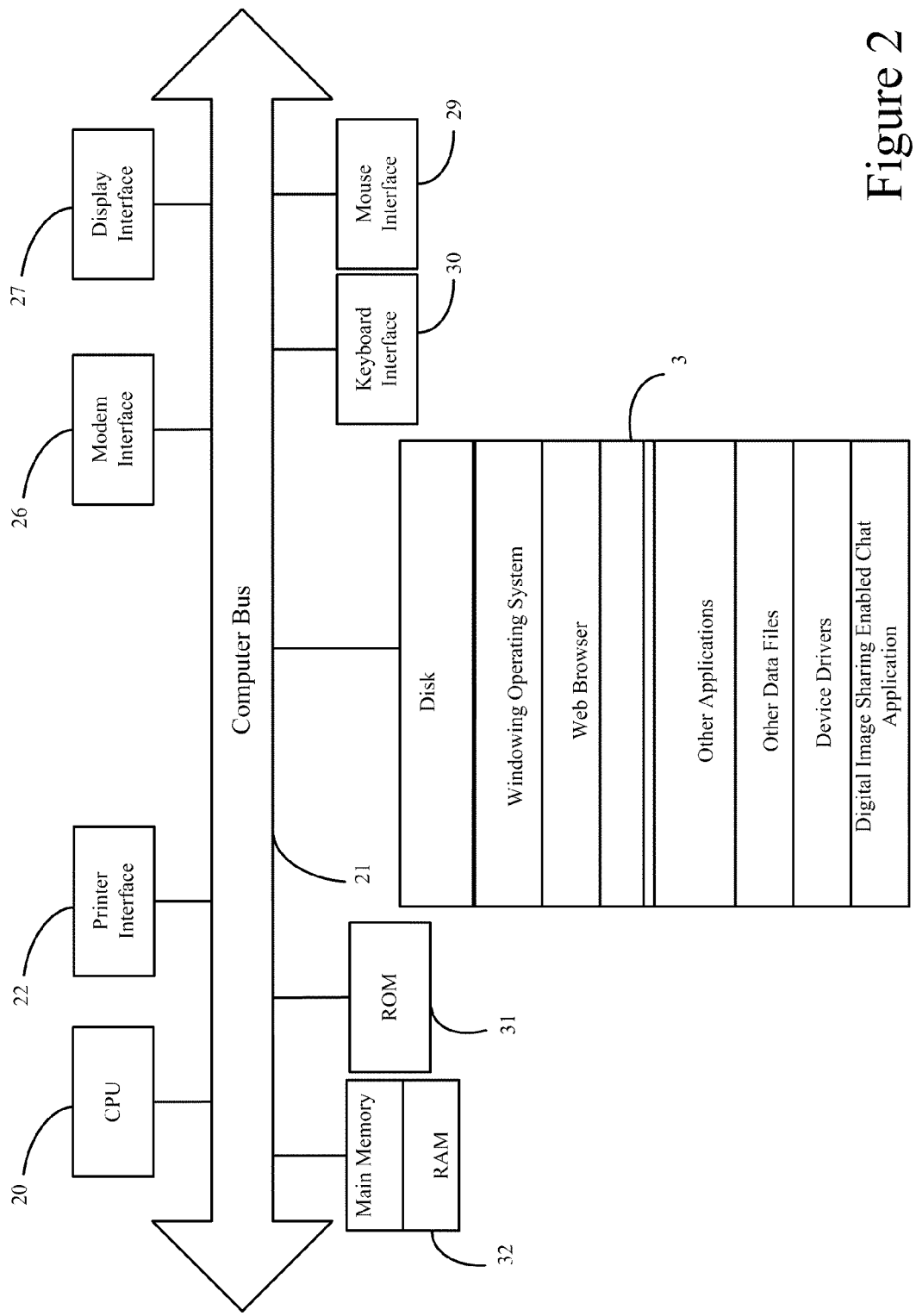
FIG. 2 is a block diagram illustrating the internal architecture of a computer utilizing the digital image sharing enabled application of the present invention.

FIG. 2 is a block diagram of the internal architecture of client computer 4 and 8. Shown in FIG. 2 is CPU 20, which is preferably a Pentium-type microprocessor, interface to computer bus 21. Also interface to computer bus 21 are printer interface 22, to allow client computer 4, 8 to communicate with a printer (not shown), modem interface 26 to enable communications with between client computer 4, 8 and its internal modem (not shown), display interface 27 for interfacing with a display monitor (not shown), keyboard interface 30 for interfacing with a keyboard (not shown), and mouse interface 29 for interfacing with a mouse (not shown). Of course, if client computer 4, 8 connects to the World Wide Web 12 by a connection other than a telephone connection, a suitable interface other than modem interface 26 by be utilized.

Read only memory (ROM) 31 stores invariant computer-executable process steps for basic system functions such as basic I/O, start-up, or reception of keystrokes from a keyboard.

Main random access memory (RAM) 32 provides CPU 20 with memory storage that can be accessed quickly. In this regard, computer-executable process steps of the digital image sharing enabled chat application of the present invention or other applications are transferred from disk 3 over computer bus 21 to RAM 32 and executed therefrom by CPU 20.

Also shown in FIG. 2 is disk 3, which, in addition to the application of the present invention, includes a windowing operating system, a web browser executable on the particular windowing operating system, other applications which may include word processing, spreadsheet, graphics, and gaming applications. Disk 3 further includes data files and device drivers as shown.

Figure 3:
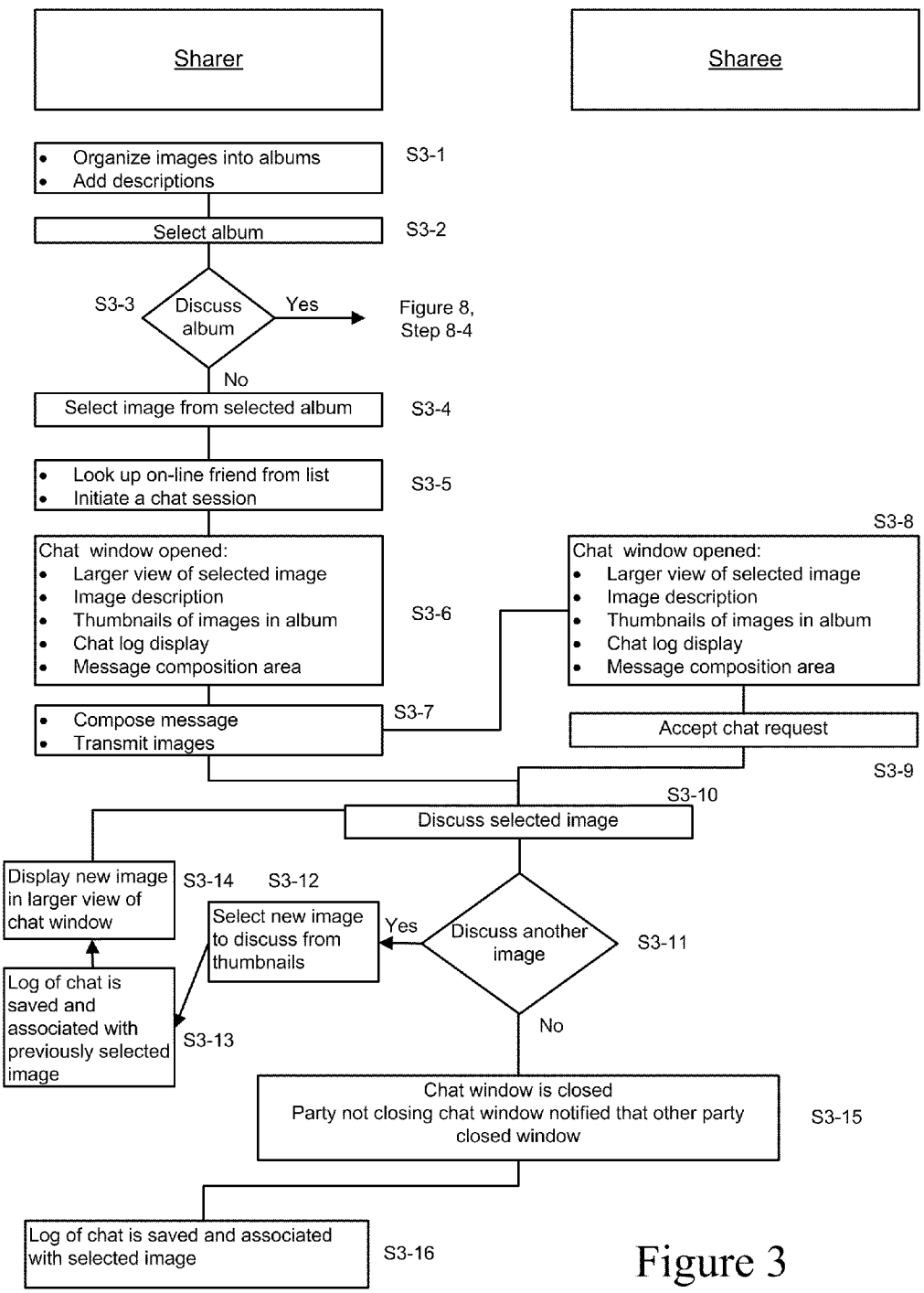
FIG. 3 is a flowchart describing a first embodiment of the digital image sharing enabled chat application of the present invention.

FIG. 3 is a flowchart depicting a first embodiment of the digital image sharing enabled chat application of the present invention. Briefly, the client wishing to share digital photographic images, hereinafter referred to as the sharer, and the client with whom the digital photographic images are to be shared, hereinafter referred to as the sharee, each launch a respective instant internet messaging service, establishing themselves as being available to begin a chat session. For purposes of the following discussion, the sharer is associated with client computer 4 and the sharee is associated with client computer 8. Digital photographic images are transmitted from the sharer to the sharee, and the sharer and sharee proceed to converse with each other, where the subject of the conversation are the transmitted digital photographic images. In this embodiment, the sharer initially intends to discuss the digital photographic images on an individual image-by-image basis.

In more detail, in step S3-1, the sharer organizes digital photographic images into respective albums and annotates the images as desired. Creation and annotation of the albums is preferably performed in the present invention with features found in many currently available photo-sharing software applications. In another embodiment, a separate photo-sharing application can be used to create and annotate the album and the album imported into the application of the present invention.

Figure 4:
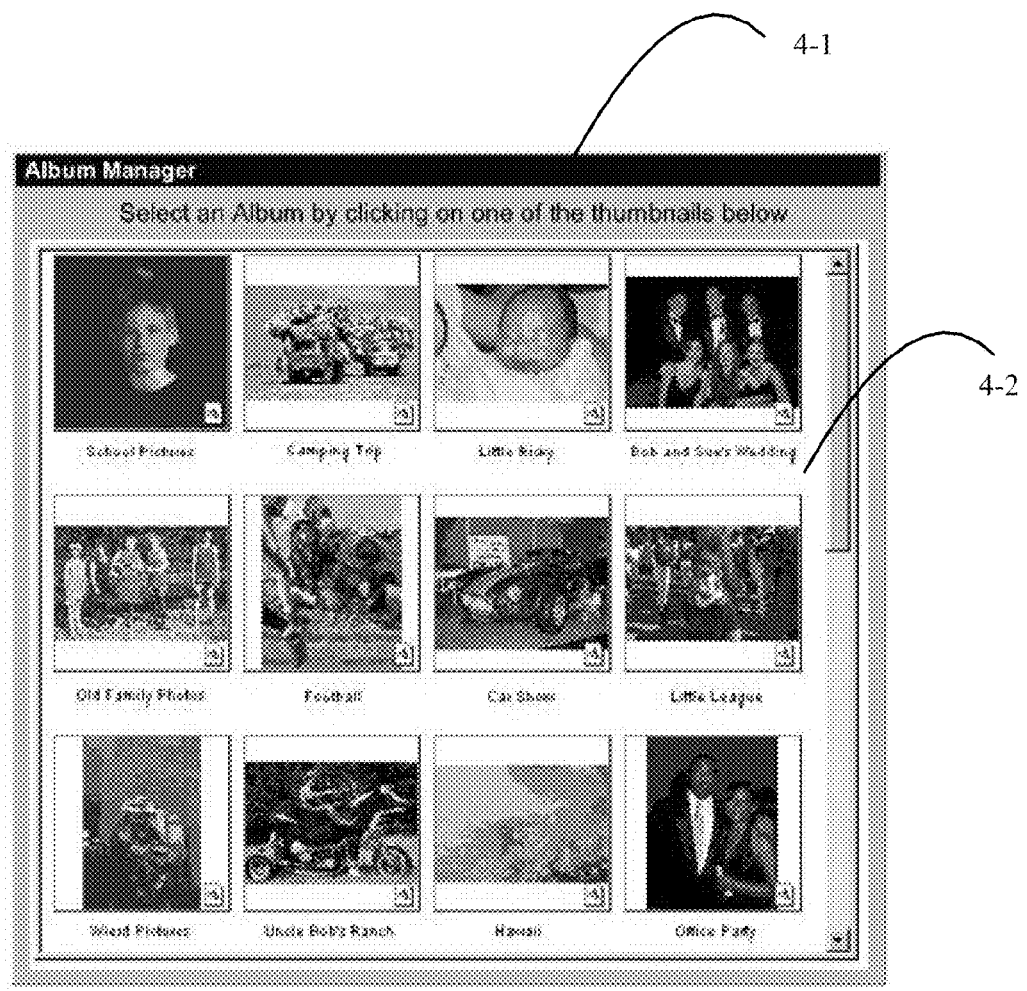
FIG. 4 depicts an album manager of the preferred embodiment of the digital image sharing enabled application of the present invention.
Figure 5:
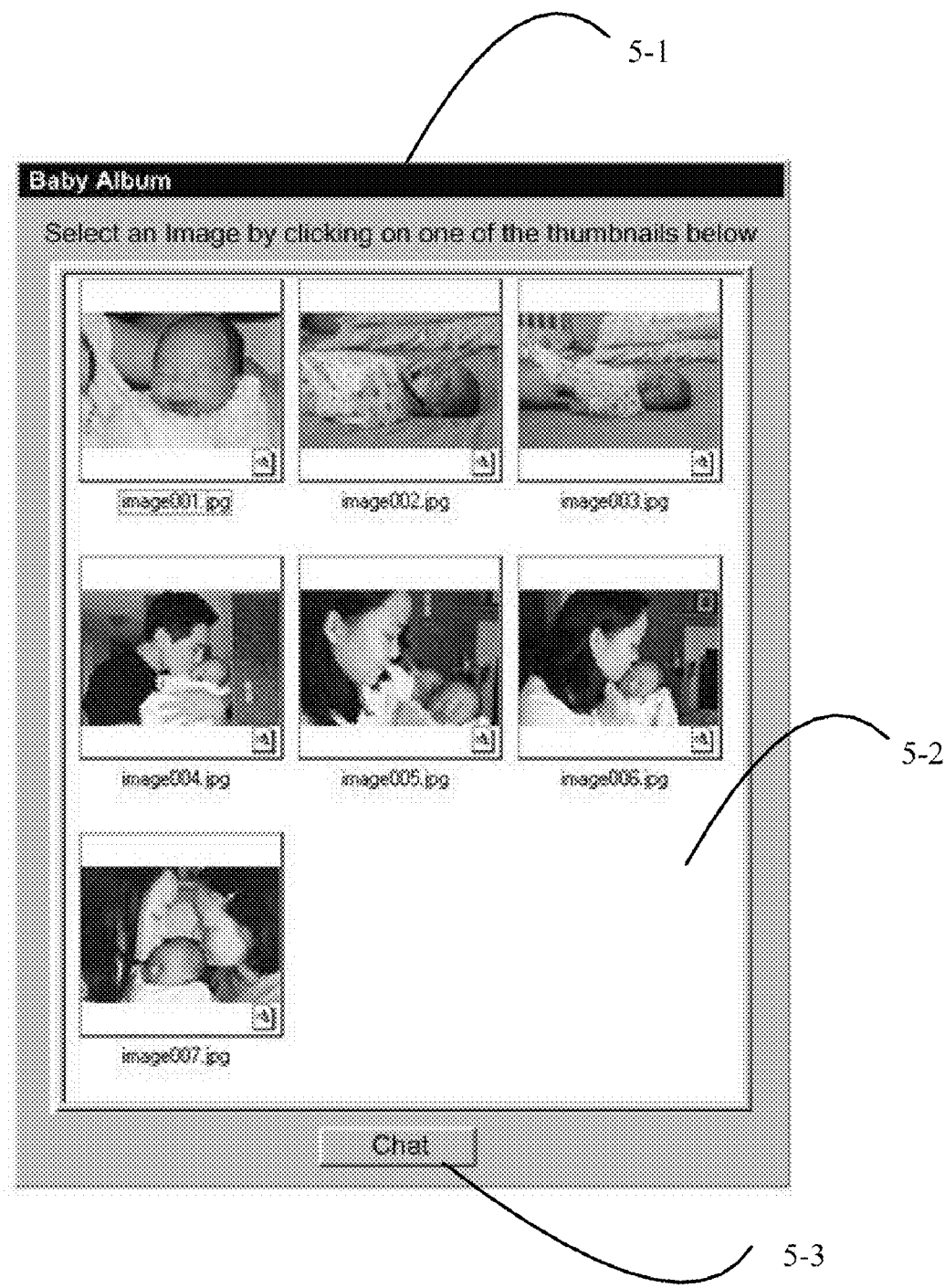
FIG. 5 depicts the contents of an album of the preferred embodiment of the digital image sharing enabled application of the present invention.

After the digital photographic images are organized and annotated, in step S3-2; the sharer selects a specific album. FIG. 4 depicts the album manager of the present invention for displaying and selecting albums. Album manager window 4-1 comprises thumbnail image area 4-2, where thumbnail images representing each of the albums organized in step S3-1 are displayed. In the preferred embodiment, an album is selected by clicking on a thumbnail image in thumbnail image area 4-2 representing the desired album. FIG. 5 depicts the contents of selected album 5-1. Thumbnail image area 5-2 contains thumbnail images of the digital photographic images that are contained in album 5-1. "Chat" button 5-3 is used to display a "buddy list" as described below with respect to FIG. 6.

Following selection of a specific album, in step S3-3, the sharer decides whether to initially discuss the selected album as a whole or a specific digital photographic image from the album. In the event the sharer wishes to discuss the album, flow proceeds to FIG. 8, which is described below. If the sharer chooses to discuss a specific digital photographic image, flow proceeds to step S3-4, where the sharer selects the digital photographic image to be discussed.

Figure 12:
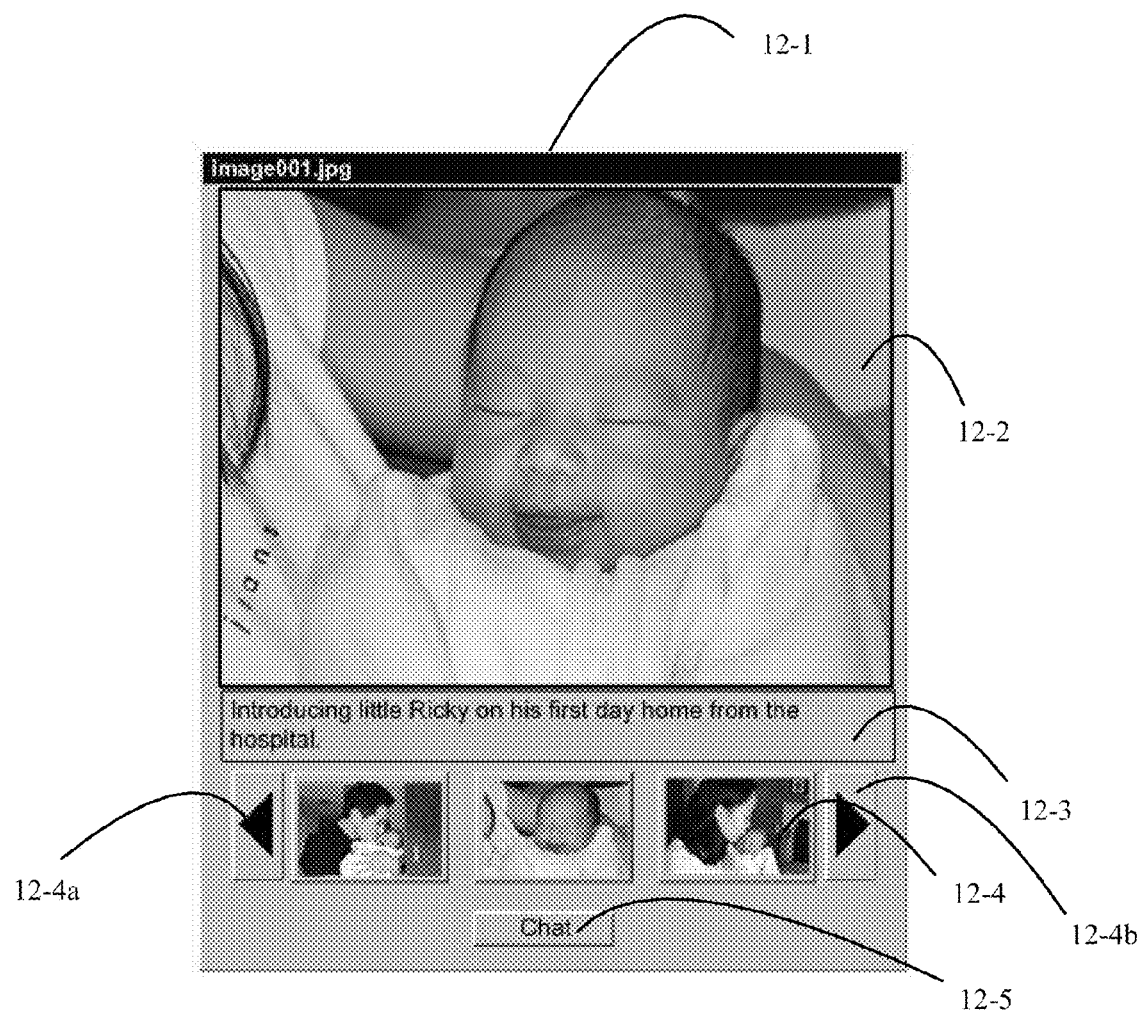
FIG. 12 depicts a digital image window of the preferred embodiment of the digital image sharing enabled application of the present invention.

Preferably, the desired digital photographic image is selected by clicking the thumbnail image representing the desired digital photographic image in thumbnail image area 5-2. Clicking on a thumbnail image in thumbnail image area 5-2 results in the display of digital image window 12-1 as depicted in FIG. 12 on client computer 4. Digital image window 12-1 is preferably divided into three sections. Section 12-2 contains a view of the selected digital photographic image. Section 12-3 contains a description associated with the selected digital photographic image. In the preferred embodiment, this is the annotation created in step S3-1. Section 12-4 contains thumbnail images of the digital photographic images in the selected album. Preferably, the selected digital photographic image is displayed along with the two neighboring digital photographic images that neighbor it in the album. Scroll buttons 12-4a and 12-4b allow for scrolling among all of the digital photographic images in the album. Digital image window 12-1 also contains "Chat" button 12-5, which is used to display a "buddy list" as described below with respect to FIG. 6.

Figure 6:
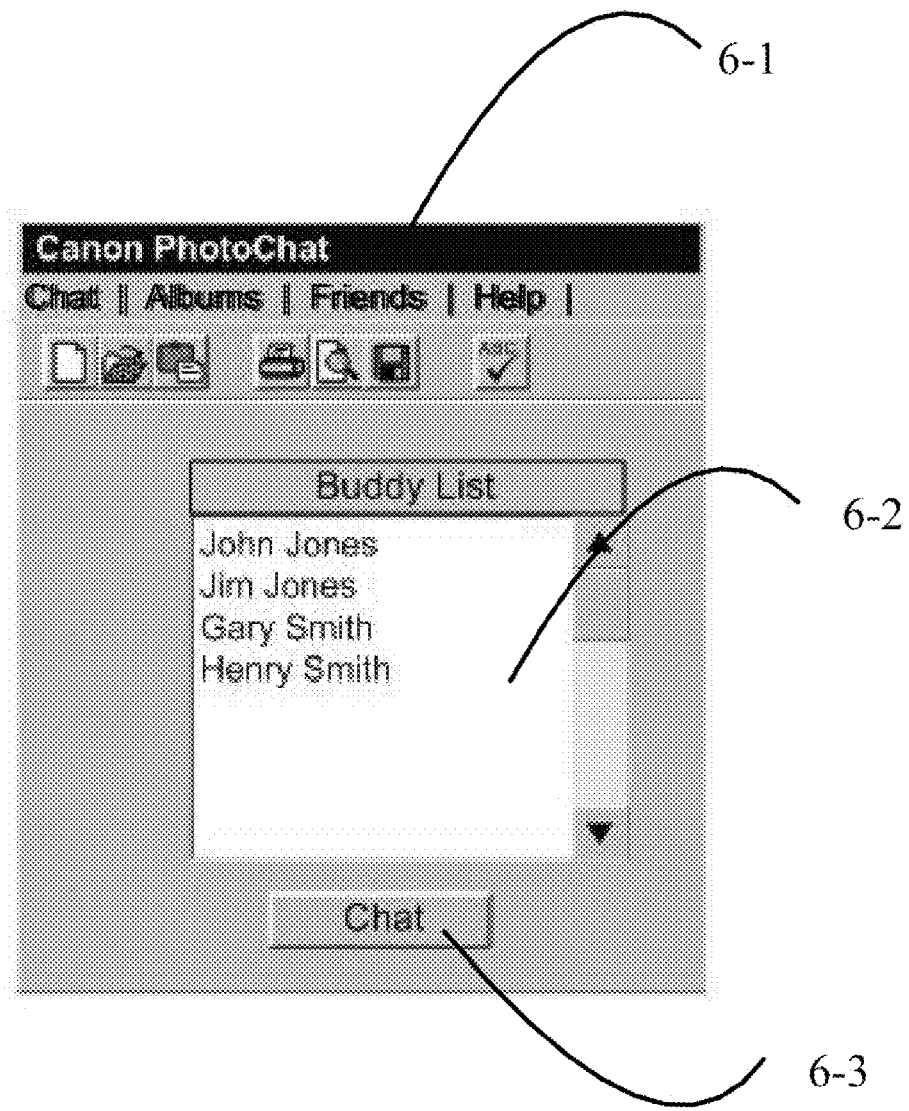
FIG. 6 depicts a "buddy list" or list of on-line friends window of the preferred embodiment of the digital image sharing enabled application of the present invention.

FIG. 6 depicts the "buddy list" or list of on-line friends of the preferred embodiment of the digital image sharing enabled application of the present invention. More specifically, "buddy list" window 6-1 comprises among other things, a "buddy list" 6-2, and "Chat" button 6-3. "Buddy list" 6-2 contains a list of "buddies" or authorized on-line partners and is used by the sharer to choose the sharee. "Buddies" who are not available (i.e., not on-line), cannot be chosen as the sharee. Typically, when a person is not available, their name in "buddy list" 6-2 appears grayed-out. "Chat" button 6-3 can be used to initiate a chat session after a name is selected from "buddy list" 6-2.

In step S3-5, the sharer chooses the sharee from "buddy list" 6-2. After the sharer chooses a name from the list, a chat session is initiated. Initiation of the chat session in the present invention is preferably performed by double-clicking on the sharee's name, but can be initiated by clicking "Chat" button 6-3 or in any other manner that would allow practice of the invention.

Figure 7:
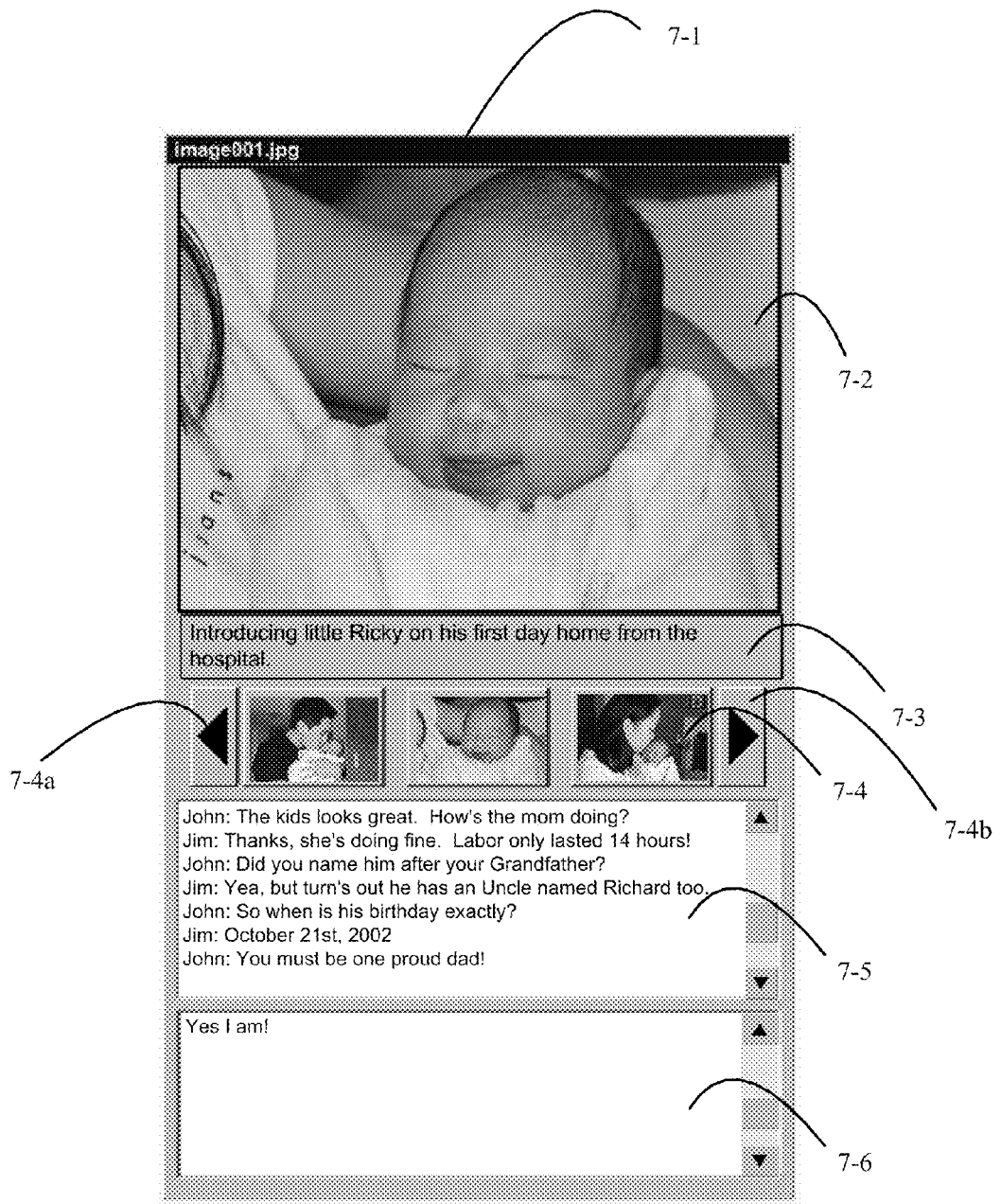
FIG. 7 depicts the chat window of the preferred embodiment of the digital image sharing enabled application of the present invention.

Upon initiation of the chat session, chat window 7-1 as depicted in FIG. 7, is opened on client computer 4 in step S3-6. Chat window 7-1 is preferably divided into five sections. Section 7-2 contains a view of the selected digital photographic image. Section 7-3 contains a description associated with the selected digital photographic image. In the preferred embodiment, this is the annotation created in step S3-1. Section 7-4 contains thumbnail images of the digital photographic images in the album. Preferably, the selected digital photographic image is displayed along with the two neighboring digital photographic images that neighbor it in the album. Scroll buttons 7-4a and 7-4b allow for scrolling among all of the digital photographic images in the album.

Section 7-5 contains a chat log displaying a running history of the current conversation. Finally, section 7-6 contains the message composition area, which is where the sharer composes the message to be sent to the sharee.

In step S3-7, the sharer initiates a real-time conversation with the sharee. The real-time conversation is initiated when the sharer completes a message in message composition area 7-6. Completion of a message also initiates transmission of the selected album to the sharee.

When the sharee receives the message and selected digital photographic image, a chat window as described above opens on the client computer 8 as shown in step S3-8. In step S3-9, the sharee accepts the received chat request by replying with a message. The sharer and sharee then proceed to discuss the digital photographic image real-time in step S3-10. As described above, a running history of the conversation is displayed in chat log 7-5.

Upon completion of the conversation, flow proceeds to step S3-11 where a choice is made whether to discuss another digital photographic image. If no other digital photographic image is to be discussed, flow advances to step S3-15, where either the sharer or sharee close their respective chat window. Closing the chat window results in termination of the chat session. The party that did not close their chat window is notified that the other party has closed their window and that the chat session has terminated.

In step S3-16, the sharer can store the chat log from the just completed chat session. The stored chat is associated with the digital photographic image. The preferred method of storing the chat log is to store it as part of the image's metadata. However, the present invention is not limited to this method and any method of storing and associating the chat log with its digital photographic image that would allow practice of the present invention would be applicable.

Figure 10:
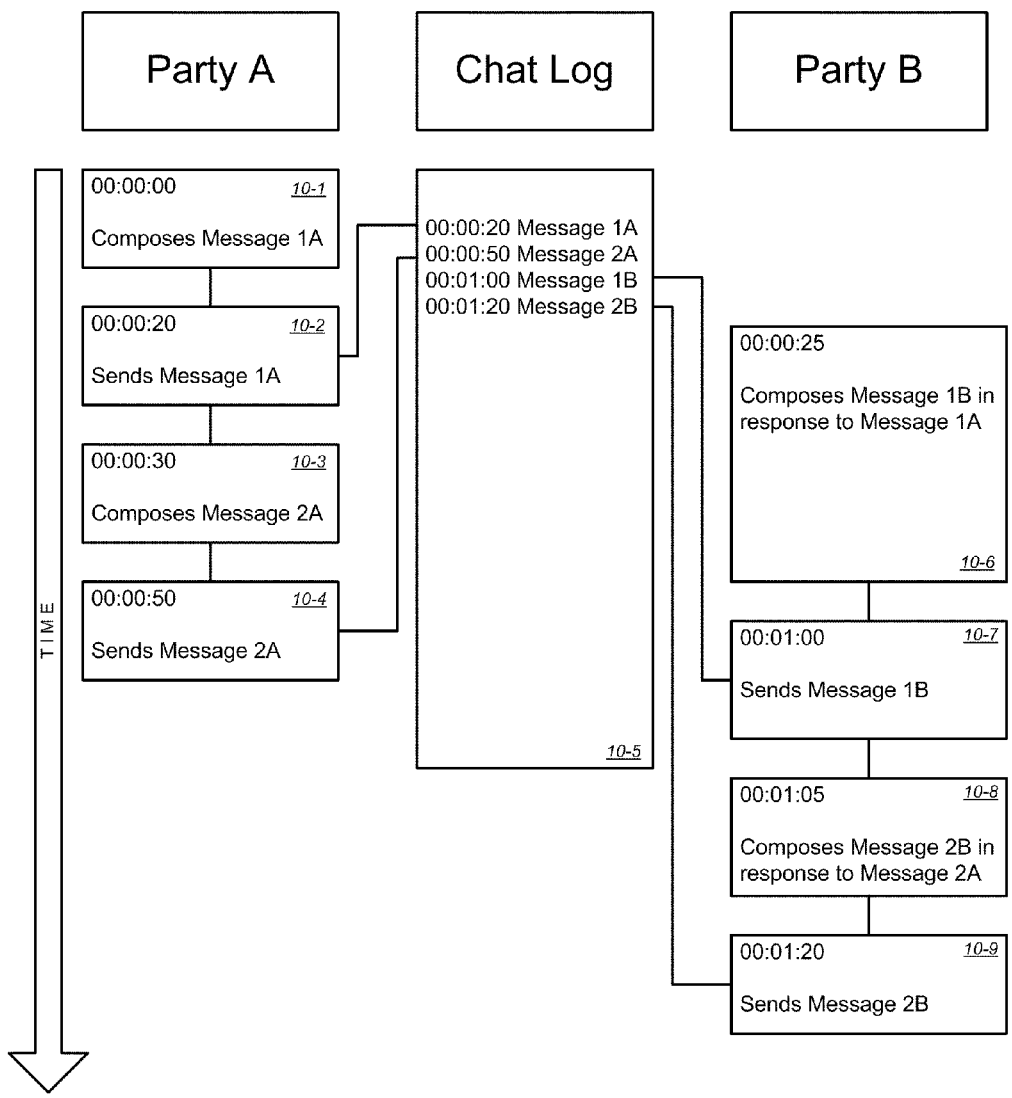
FIG. 10 depicts the current state of the art with respect to displaying a chat log.

The chat log is stored and associated with the digital photographic image so that the conversation, which is rich in detail, relating to that digital photographic image is not lost. However, current chat logs display the messages based on when the message was completed/transmitted as shown in FIG. 10, and at times may not follow a logical order. For example, as shown in 10-1, Party A begins composing message 1A at time 0:00 and then transmits it at time 0:20 in 10-2. In 10-6, at time 0:25, Party B begins composing message 1B in response to message 1A. However, as shown in 10-7, Party B does not transmit message 1B until time 1:00 In the meantime, Party A has begun composing message 2A in step 10-3 at time 0:25 and transmitted it at time 0:50 in step 10-4. In step 10-8, Party B begins composing message 2B in response to message 2A at time 1:05, and in step 10-9 does not transmit it until time 1:20.

As shown in chat log 10-5, message 1A appears first, followed by message 1B, and then by messages 2A and 2B because Party A transmitted messages 1A and 1B before Party B transmitted messages 2A and 2B. This is true even though composition of message 1B began before composition of message 2A. This type of message flow makes it difficult for someone wishing to follow the chat real-time since messages 1A and 2A were displayed before that person's respective responses were displayed. It also makes it more difficult for someone wishing to view the saved chat log to follow the trail of the conversation.

Figure 11:
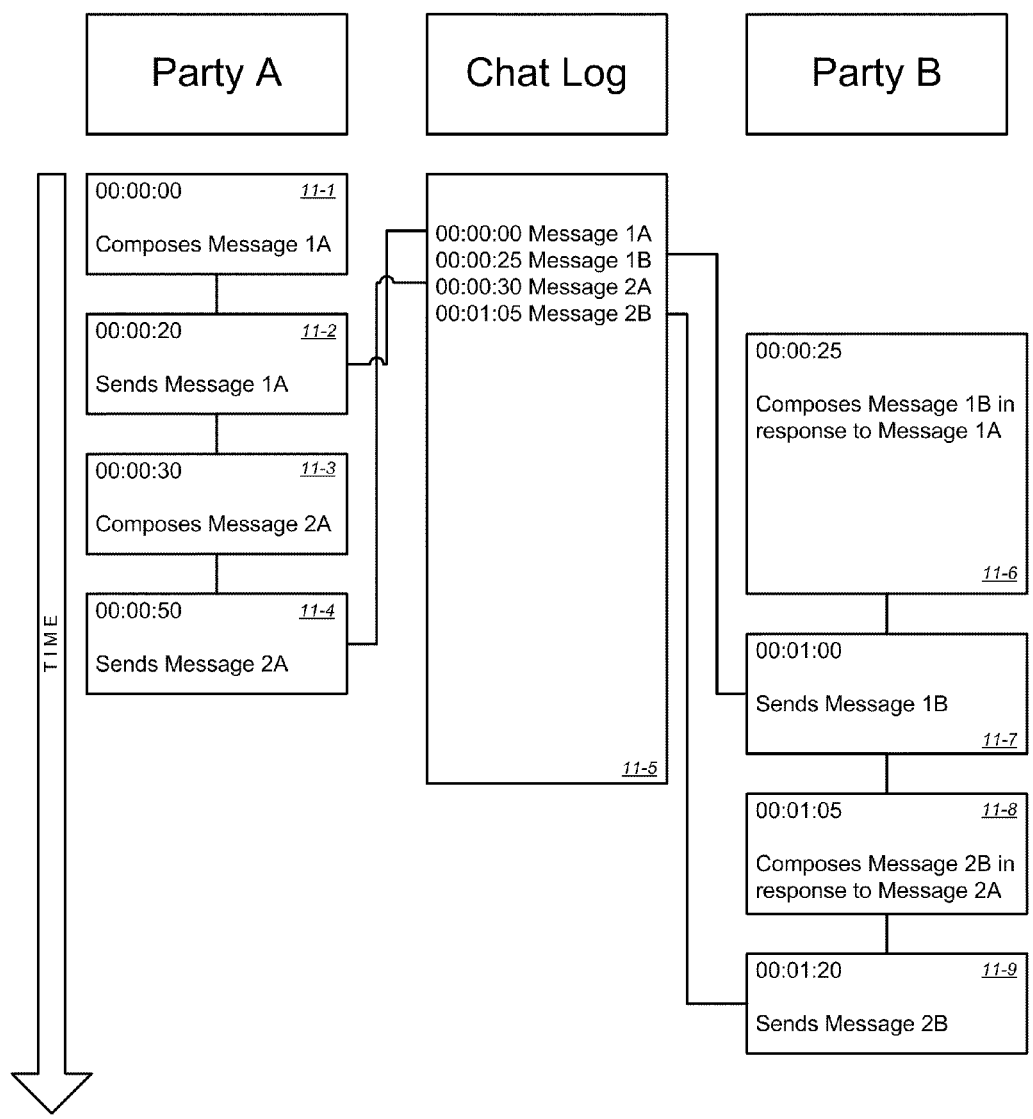
FIG. 11 depicts displaying a chat log of the digital image sharing enabled application of the present invention.

To overcome this problem and make the conversation in chat log 7-5 easier to follow, each message during the chat session is tagged with the time composition of the message begins in message composition area 7-6. In the preferred embodiment, the message would be tagged with the time the first character of the message was entered. As shown in FIG. 11, in 11-1, Party A begins composing message 1A at time 0:00 and transmits message 1A at time 0:20 in 11-2. In 11-6, Party B begins composing message 1B in response to message 1A at time 0:25 and in 11-7 transmits message 1B at time 1:00. Party A begins composing message 2A in 11-3 at time 0:30 and transmits message 2A in 11-4 at time 0:50. Party B begins composing message 2B in response to message 2A at time 1:05 in 11-8 and transmits message 2B at time 1:20 in 11-9. When displayed in chat log 11-5, the messages appear in order based on the time their composition was initiated, not the time they were transmitted. This provides a logical flow to the conversation, even though, for example, message 2A was transmitted before message 1B.

In yet another embodiment, a user is provided with the ability to select a particular message in the chat log and have the user's next message appear after the selected message. In still yet another embodiment, the user is provided with the ability to enable disable the feature of tagging the message at the time of composition.

Returning to the flow of FIG. 3, if in step S3-11 a decision is made to discuss another digital photographic image, flow proceeds to step S3-12 where the new digital photographic image to be discussed is selected. After selection of the new digital photographic image, in step S3-13, the chat log of the previously selected digital photographic image is saved in the manner discussed above with respect to step S3-16. In step S3-14, the newly selected digital photographic image is displayed in section 7-2 of chat window 7-1. The digital photographic image is then discussed in step S3-10.

Returning to step S3-3, if the sharer decides to discuss the selected album as a whole, as discussed above, flow proceeds to FIG. 8, where FIG. 8 is a flowchart depicting another embodiment of the present invention.

Figure 8:
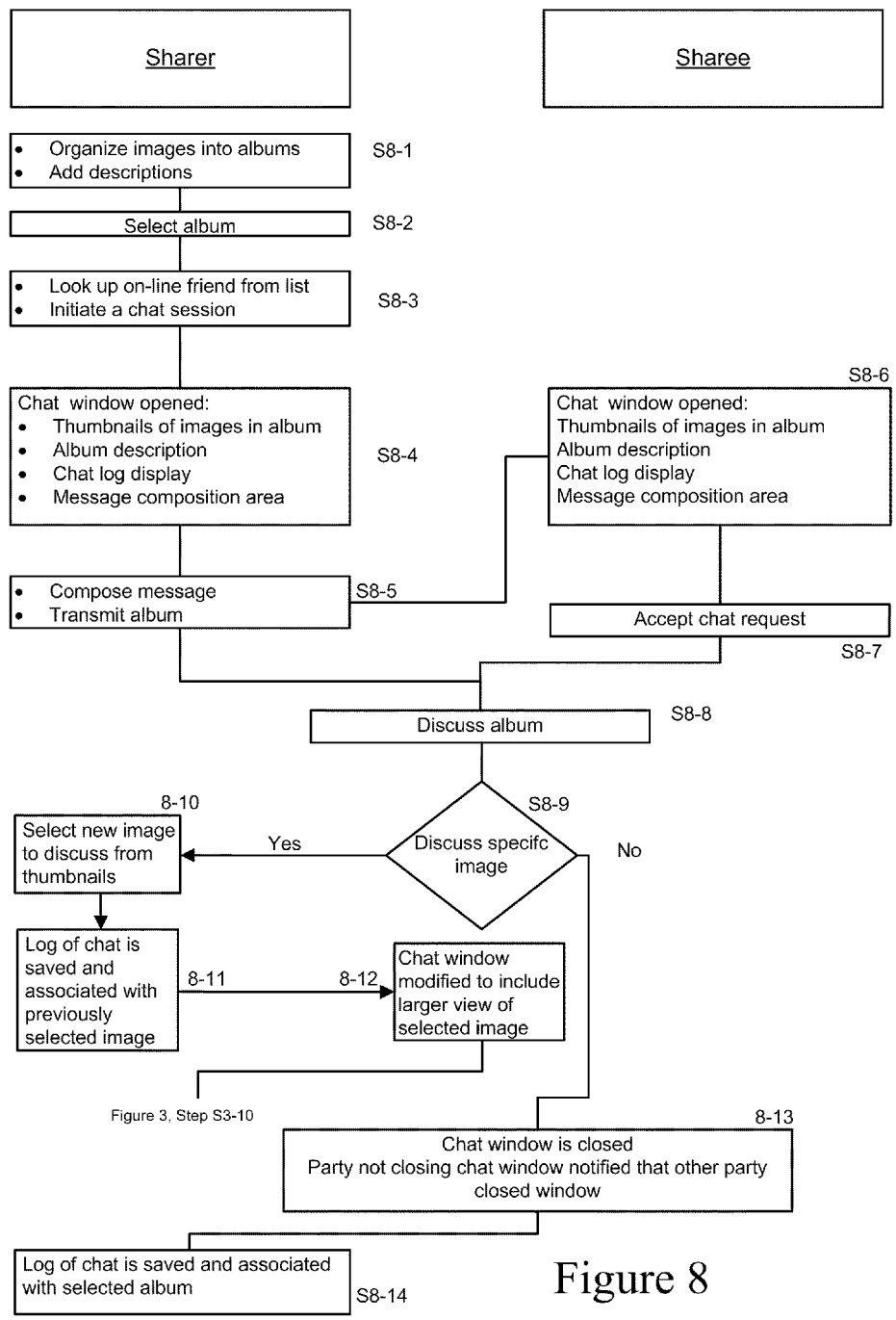
FIG. 8 is flowchart describing another embodiment of the digital image sharing enabled application of the present invention.

Several steps of FIG. 8 are similar to those of FIG. 3. In the instance where the steps are identical, the detailed description provided for FIG. 3 above is applicable and a detailed description will only be provided for the steps of FIG. 8 that differ from those of FIG. 3.

Steps 8-1, 8-2 and identical to steps S3-1 and S3-2. In Step 8-3, since the sharer has chosen to discuss the album as a whole, instead of clicking on a thumbnail image in thumbnail image area 5-2, "Chat" button 5-3 is selected. Selection of "Chat" button 5-3 results in displaying of "buddy list" window 6-1. Selection of a name from the list and initiation of the chat session in step S8-3 is identical to that described above with respect to step S3-5.

Figure 9:
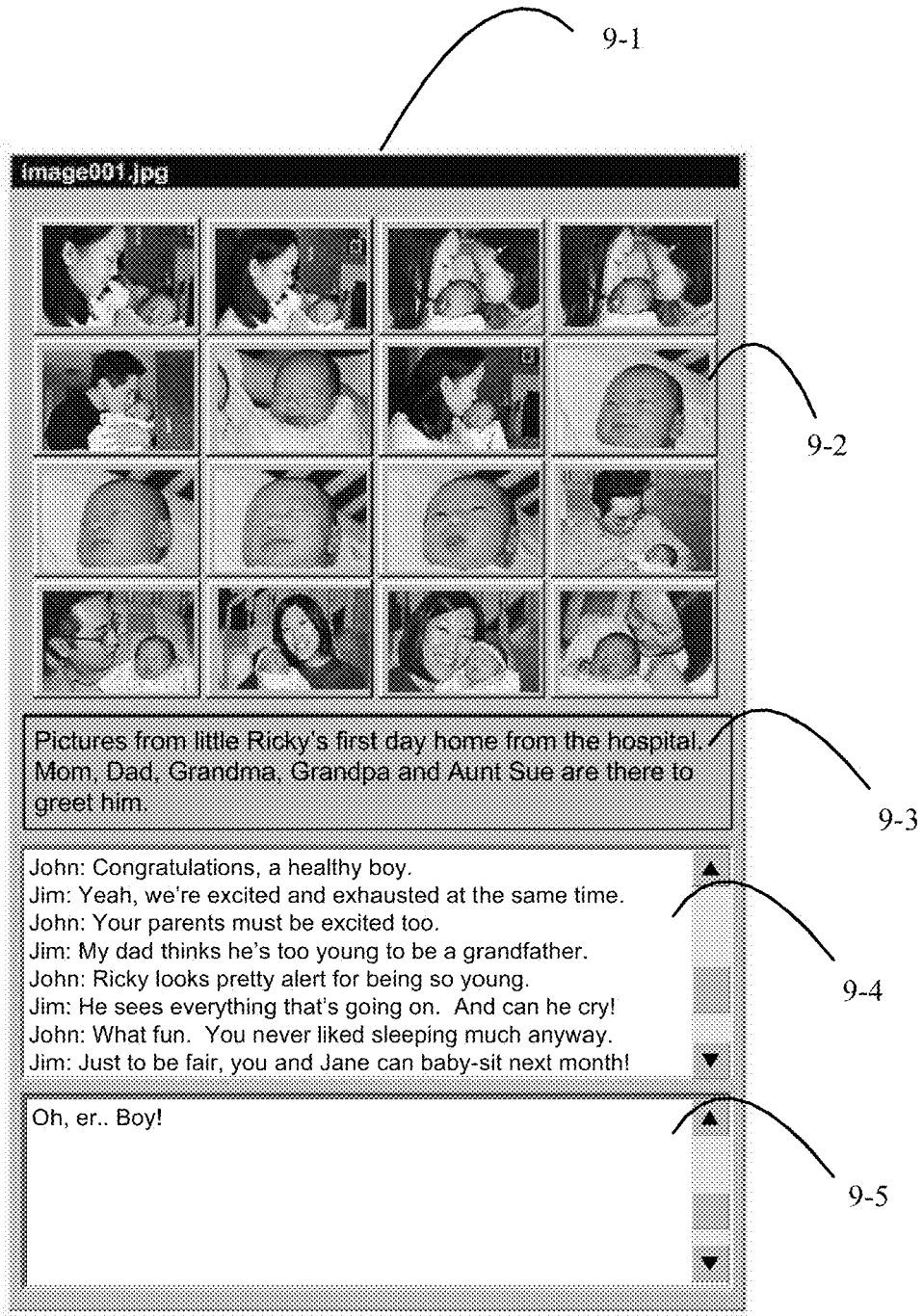
FIG. 9 depicts the chat window of another embodiment of the digital image sharing enabled application of the present invention.

In Step 8-4, chat window 9-1 as depicted in FIG. 9, is opened on client computer 4 upon initiation of the chat session. Chat window 9-1 is divided into four sections. Section 9-2 contains thumbnail image views of the digital photographic images contained in album selected in step S8-2. Section 9-3 contains a description associated with the selected album. Section 9-4 contains a chat log that displays a running history of the current conversation. Finally, section 9-5 contains the message composition area, which is where the sharer composes the message to be sent to the sharee.

In step 8-5, the sharer initiates a real-time conversation with the sharee as described above with respect to step S3-7 of FIG. 3. As in the case of step S3-7, in step 8-5, composition of a message results in transmission of the selected album to the sharee. When the sharee receives the message and selected album, chat window 8-1 opens on client computer 8 in step S8-6. Step 8-7 is identical to step S3-9.

After the sharee accepts the chat request, the sharer and sharee proceed to discuss the selected album real-time in step S8-8. A running history of the conversation is displayed in chat log 9-4.

Upon completion of the conversation, flow proceeds to step S8-9, where a choice is made whether to discuss a specific digital photographic image in the album. If a specific digital photographic image is not to be discussed, flow advances to steps 8-13 and 8-14, which are identical to steps 3-15 and 3-16 of FIG. 3. The only difference is that in step S8-14, the stored chat is associated with the selected album. The preferred method of storing the chat log is to store it as part of the album's metadata. However, the present invention is not limited to this method and any method of storing and associating the chat log with its respective album that would allow practice of the present invention would be applicable.

If in step 8-9, a choice is made to discuss a specific digital photographic image in the album, flow proceeds to step S8-10. In step S8-10, a digital photographic image is selected from the thumbnail images in section 9-2 by clicking on the desired image. After selection of a digital photographic image, in step S8-11, the chat log of the album is saved in the manner discussed above with respect to step S8-14.

In step S8-12, chat window 9-1, which is displayed on both client computers 4, 8 is replaced with chat window 7-1. Section 7-2 contains the digital photographic image selected in step S8-10, while section 7-3 is updated to reflect the description associated with the selected digital photographic image in section 7-2. The contents of the remaining sections of chat window 7-1 are as described above. After chat window 7-1 is displayed on client computers 4, 8, the steps of FIG. 3 beginning at step S3-10 are applicable While the invention is described above with respect to what is currently its preferred embodiment, it is to be understood that the invention is not limited to that described above. To the contrary, the invention is intended to cover various modifications and equivalent arrangements within the spirit and scope of the appended claims.

What is claimed is:

1. A method for sharing image data and text data, the method comprising:
    establishing a chat session between a first real-time chat client and at least a second real-time chat client;
    displaying images available to be shared in a selection window of the first real-time chat client after the chat session is established;
    receiving, in the selection window, one or more selections of a plurality of the images available to be shared, wherein the one or more selections indicate images to be shared with at least the second real-time chat client;
    transmitting the selected plurality of the images to at least the second real-time chat client via the chat session, wherein the selected plurality of the images is transmitted after the chat session is established; and
    displaying the selected plurality of the images in a window of the first real-time chat client.

2. A method according to claim 1, wherein establishing a chat session includes one or more of accepting a request from at least the second real-time chat client to establish a chat session and sending a request to at least the second real-time chat client to establish a chat session.

3. A method according to claim 1, wherein the window of the first real-time chat client includes a chat window.

4. A method according to claim 3, wherein the plurality of the images is displayed in a first section of the chat window.

5. A method according to claim 4, further comprising displaying a log in a second section of the chat window.

6. A method according to claim 5, further comprising storing the log as part of metadata of one or more images of the plurality of the images.

7. A method according to claim 3, wherein the chat window includes a third section, and wherein the third section displays a message composition area.

8. A method according to claim 1, wherein the plurality of the images is displayed for the duration of the chat session.

9. A method according to claim 1, wherein the window of the first real-time chat client includes a chat window; and
    wherein the chat window includes a first section and a second section,
    wherein the first section displays the plurality of the images, and
    wherein the second section displays at least one of the plurality of the images.

10. A method according to claim 9, wherein the at least one of the plurality of the images being displayed in the second section is changed by selecting an image different from the at least one of the plurality of the images from the plurality of the images in the first section.

11. A method according to claim 9, wherein the second section is larger than the first section, and wherein the size of the at least one of the plurality of the images displayed in the second section is larger than respective sizes of the plurality of the images displayed in the first section.

12. A method according to claim 1, wherein the selection window is a different window than the window of the first-real time chat client that displays the selected plurality of the images.

13. A computing device for sharing images and text, the computing device comprising:
    a computer-readable storage device;
    a network interface configured to communicate with one or more other computing devices; and
    one or more processors configured to cause the computing device to generate a communication window of a first real-time communication client, initiate a chat session between the first real-time communication client and at least a second real-time communication client, receive a selection of a plurality of images to be shared with the at least second real-time communication client after initiation of the communication session, add the plurality of images to the communication window of the first real-time communication client, and send the plurality of images to the at least second real-time communication client via the chat session.

14. A computing device according to claim 13, wherein the plurality of images is added to a first section of the communication window.

15. A computing device according to claim 14, wherein the one or more processors are further configured to cause the computing device to include text describing the plurality of images in a second section of the communication window.

16. A computing device according to claim 13, wherein the one or more processors are further configured to cause the computing device to add a log of exchanged text data to a third section of the communication window.

17. A computing device according to claim 13, wherein the one or more processors are further configured to cause the computing device to include a message composition area in a fourth section of the communication window.

18. A computing device according to claim 13, wherein the communication window contains a plurality of sections, and wherein a first section includes the plurality of images and a second section includes at least one image of the plurality of images.

19. A computing device according to claim 18, wherein the at least one of the plurality of images included in the second section is changed upon receiving a selection of an image different from the at least one of the plurality of images from the plurality of images included in the first section.

20. One or more non-transitory computer-readable media storing computer-executable instructions thereon that, when executed by one or more computing devices, cause the one or more computing devices to perform operations comprising:

generating a messaging window for a real-time messaging application operating on a computing device;

establishing a messaging session between the real-time messaging application operating on the computing device and a real-time messaging application operating on another computing device;

receiving, in a selection window operating on the computing device, one or more selections of a plurality of images available to be shared, wherein the one or more selections indicate images to be shared with the real-time messaging application operating on another computing device;

transmitting the selected plurality of images from the real-time messaging application operating on the computing device to the real-time messaging application operating on another computing device via the messaging session; and adding the plurality of images to the messaging window.

21. One or more non-transitory computer-readable media according to claim 20, wherein the plurality of images is received from the first real-time messaging application operating on the computing device during the establishing of the messaging session.

22. One or more non-transitory computer-readable media according to claim 20, wherein the messaging window includes a first section, and the first section includes the plurality of images.

23. One or more non-transitory computer-readable media according to claim 22, wherein the messaging window includes a second section, and the second section includes at least one of the plurality of images.

24. One or more non-transitory computer-readable media according to claim 23, wherein the at least one of the plurality of images included in the second section is changed by selecting an image different from the at least one of the plurality of images from the plurality of images included in the first section.

25. One or more non-transitory computer-readable media according to claim 24, wherein the at least one of the plurality of images included in the second section has a larger size than the associated image in the plurality of images in the first section.

26. One or more non-transitory computer-readable media according to claim 20, wherein the messaging window includes a third section, and the third section includes a messaging log.

27. One or more non-transitory computer-readable media according to claim 20, wherein the messaging window includes a fourth section, and the fourth section includes a message composition area.

28. One or more non-transitory computer-readable media according to claim 20, wherein the selection window is different than the messaging window.

* * * * *